United States Patent
Duan et al.

(10) Patent No.: US 10,625,627 B2
(45) Date of Patent: Apr. 21, 2020

(54) METHOD OF REMEDYING LITHIUM PLATING IN A HIGH VOLTAGE BATTERY

(71) Applicant: FORD GLOBAL TECHNOLOGIES, LLC, Dearborn, MI (US)

(72) Inventors: Xiaohong Nina Duan, Canton, MI (US); Chi Paik, Grosse Ile, MI (US); Jianrong Huang, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 15/986,051

(22) Filed: May 22, 2018

(65) Prior Publication Data

US 2019/0359066 A1 Nov. 28, 2019

(51) Int. Cl.
*B60L 58/10* (2019.01)
*H02J 7/00* (2006.01)
*H01M 10/0525* (2010.01)
*H01M 2/10* (2006.01)

(52) U.S. Cl.
CPC ........... *B60L 58/10* (2019.02); *H01M 2/1083* (2013.01); *H01M 10/0525* (2013.01); *H02J 7/0081* (2013.01); *H02J 7/0083* (2013.01)

(58) Field of Classification Search
None
See application file for complete search history.

(56) References Cited

U.S. PATENT DOCUMENTS

| | | | |
|---|---|---|---|
| 2010/0301809 A1* | 12/2010 | Bhade | H01M 10/4207 320/148 |
| 2016/0064957 A1* | 3/2016 | Card | H02J 7/007 320/129 |
| 2017/0170669 A1 | 6/2017 | Wang et al. | |
| 2017/0190262 A1 | 7/2017 | Jin et al. | |
| 2017/0203654 A1 | 7/2017 | He et al. | |
| 2017/0203660 A1 | 7/2017 | He et al. | |

* cited by examiner

*Primary Examiner* — David V Henze-Gongola
(74) *Attorney, Agent, or Firm* — David Kelley; Brooks Kushman P.C.

(57) ABSTRACT

A method for a vehicle comprises, by a controller, responsive to charge current for a battery exceeding a threshold, inhibiting further charging of the battery. The method further includes, responsive to the vehicle achieving a predefined state following the charge current exceeding the threshold, discharging the battery for a predetermined time at a predetermined current both defined by an amount and duration that the charge current exceeded the threshold to deplate lithium from an anode of the battery.

17 Claims, 2 Drawing Sheets

METHOD OF REMEDYING LITHIUM PLATING IN A HIGH VOLTAGE BATTERY

TECHNICAL FIELD

The present disclosure relates to remedying lithium plating in a high-voltage battery, and more particularly, a control strategy for remedying lithium plating.

BACKGROUND

Electrified vehicles (EV), such as battery electric vehicles (BEV) and hybrid-electric vehicles (HEV), typically include one or more electric machines mechanically coupled to a hybrid transmission. The hybrid transmission may further be mechanically coupled to a conventional engine. The electric machine is capable of operating as a motor or a generator to propel the vehicle. The electric machines may provide propulsion and deceleration capability for the EV when the engine is turned on or off. The electric machines may also act as generators, recovering mechanical energy as electrical energy. A traction battery, or battery pack, may be used to store the electrical energy, which can later be used by the electric machines.

A vehicle battery pack typically provides a high voltage direct current (DC) output, and may be electrically coupled to one or more power electronics modules. The power electronics modules may also be electrically coupled to the electric machines, and may provide bi-directionally transferable energy between the battery and the electric machines. A battery management system may include one or more controllers, such as a Battery Energy Control Module (BECM), which is typically used to monitor and control the performance of the traction battery. In normal operation, a traction battery provides a DC voltage while the electric machines operate with a three-phase alternating current (AC) to function. The power electronics module converts the DC voltage to a three-phase AC current to operate the electric machines. In a regenerative mode, the power electronics module converts the three-phase AC current from the electric machines, acting as generators, to the DC voltage compatible with the traction battery.

A lithium-ion battery is typically used in electrified vehicles, but lithium-ion batteries are not capable of accepting higher charge current than allowed by design, especially at temperatures lower than normal temperature (e.g., 25° C.). When the charging current exceeds the design limit of the battery, lithium plating may occur on the anode of battery cell, which decreases battery capacity and increases cell resistance. In some instances, the battery may need to be replaced depending on the extent of plating.

SUMMARY

According to an embodiment, a method for a vehicle comprises, by a controller, responsive to charge current for a battery exceeding a threshold, inhibiting further charging of the battery. The method further includes, responsive to the vehicle achieving a predefined state following the charge current exceeding the threshold, discharging the battery for a predetermined time at a predetermined current both defined by an amount and duration that the charge current exceeded the threshold to deplate lithium from an anode of the battery.

According to one or more embodiments, the predetermined current may be a pulse current. In an embodiment, the threshold may be based on a limit related to when lithium plating occurs in the battery. In one or more embodiments, discharging the battery may include operating a vehicle heater or AC connected to the battery. In another embodiment, the method may further comprise preventing a vehicle cold start prior to discharging the battery. According to one or more embodiments, discharging the battery may include signaling, by the controller, a DC/DC converter to draw a bypass current flow from the battery defined by the predetermined current. In one or more embodiments, discharging the battery includes closing, in response to a command from the controller, a passive balance switch to discharge the battery through passive balance resistance. According to one or more embodiments, the predefined state may be an able to drive during discharge state, parked state, or key-off state.

According to an embodiment, a vehicle includes a controller in communication with a battery and configured to, responsive to charge current of a battery exceeding a threshold and the vehicle achieving a predefined state, inhibit battery charging and discharge the battery at a predetermined current for a predetermined time that are both defined by an amount and duration that the charge current exceeded the threshold to remove plated lithium from an anode of the battery.

According to one or more embodiments, the vehicle may further include a DC/DC converter in communication with the controller and the battery and configured to discharge the battery by drawing a bypass current flow from the battery defined by the predetermined current. In one or more embodiments, the vehicle may further include a passive balance switch in communication with the controller, wherein the controller may be configured to discharge the battery by closing the passive balance switch to discharge the battery through passive balance resistance. According to one or more embodiments, the vehicle may further include a vehicle heater or AC in communication with the battery and the controller, wherein the controller may be configured to discharge the battery by operating the vehicle heater or AC. In some embodiments, the controller may be further configured to discharge the battery at a lower amount than the predetermined current until the vehicle achieves the predefined state.

According to an embodiment a method for a vehicle includes, by a controller, responsive to charge voltage exceeding a threshold indicative of lithium plating on an anode, inhibiting battery charging responsive to the vehicle being in a predefined state. The method further includes discharging the battery for a predetermined time to release lithium ions at a predetermined current that is defined by an amount and duration the charge voltage exceeded the threshold to remove lithium plating on the anode.

According to one or more embodiments, the predetermined current may be a pulse current. In one or more embodiments discharging the battery may include signaling, by the controller, a DCDC converter to draw a bypass current flow from the battery defined by the predetermined current. According to embodiments, discharging the battery may include closing, by the controller, a passive balance switch connected to the battery to discharge the battery through passive balance resistance. In one or more embodiments, discharging the battery may include operating a vehicle heater or AC. The method may further include preventing a vehicle cold start when the charge voltage exceeds the threshold prior to discharging the battery. In one or more embodiments, the predefined state may be an able to drive during discharge state, parked state, or key-off state.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to embodiments of the present disclosure, a method of removing lithium plating from a vehicle traction battery is disclosed. The method of the present disclosure removes plating in a cell using existing vehicle components. Further, the method can be performed to remove the lithium plating caused specifically by battery exposure to higher current which leads to battery aging and higher cell resistance.

An electrified vehicle (EV) typically includes a vehicle battery pack, and a battery management system including one or more controllers, such as, for example, a battery electronic control module (BECM), to monitor and control battery performance. Although HV battery, battery, or battery pack is used interchangeably, battery is not intended to be limited to any particular number of batteries, traction batteries, or cells in a pack. The battery pack may provide high voltage DC current to one or more power electronics modules, and other vehicle features. The power electronics modules may also be electrically coupled to the electric machines, and may provide bi-directionally transferable energy between the battery and the electric machines. EVs may also include low voltage electrical components and accessories, as well as a lower voltage batteries for supporting the low voltage components.

Figure 1:
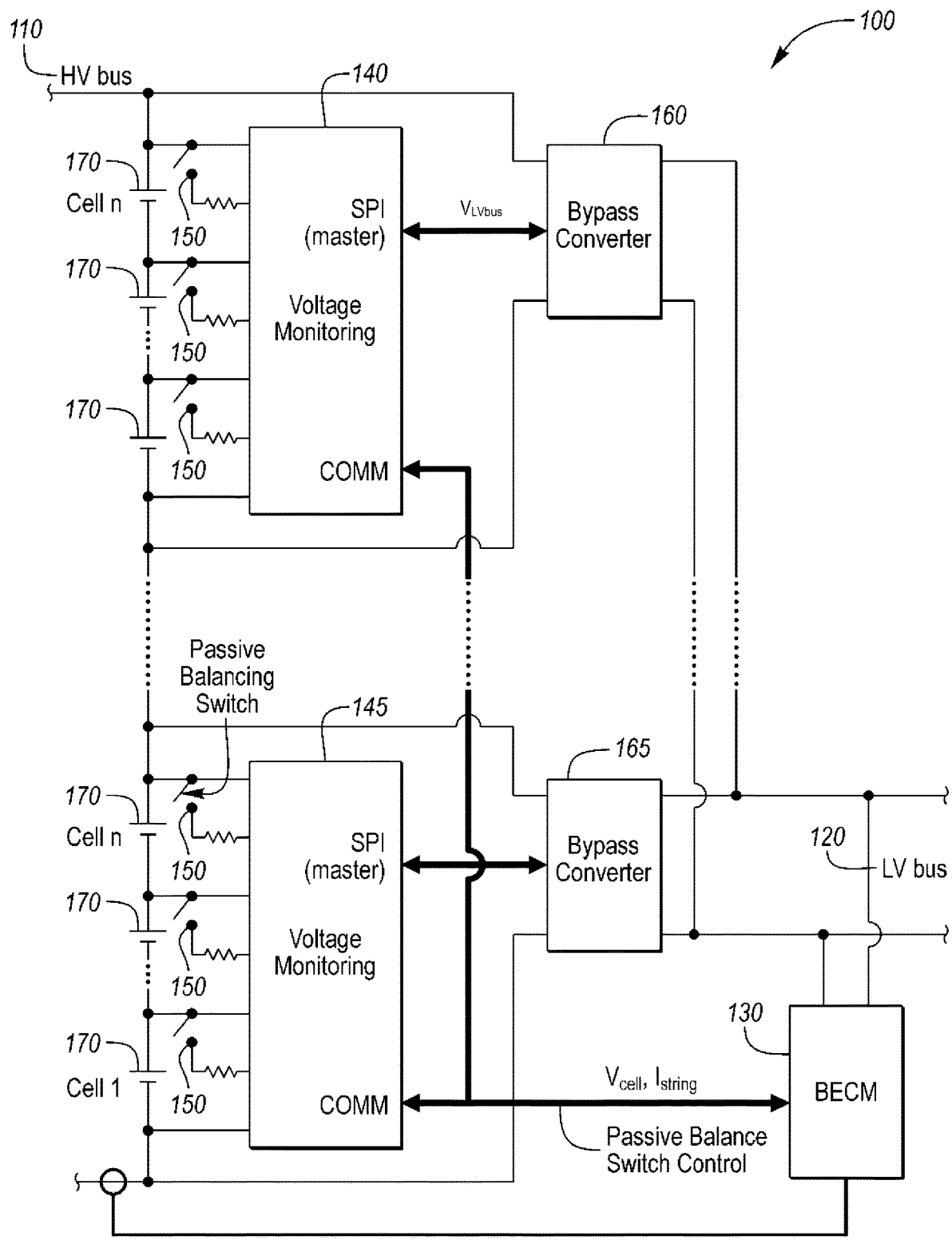
FIG. 1 shows a modular circuit for a vehicle battery system, according to an embodiment.

FIG. 1 shows a modular circuit 100 of a vehicle battery system. Modular circuit 100 includes HV bus 110, LV bus 120, BECM 130, voltage monitors 140, 145, and passive balance switches 150. In order to supply power from high voltage battery pack (HV bus 110) to the low voltage components (LV bus 120) and/or to recharge the low voltage battery, a DC/DC converter 160, 165, or a bank of DC/DC converters with their outputs connected in parallel, has typically been used to down convert the high voltage current to an appropriate lower voltage current to drive a low voltage power bus, as shown in FIG. 1. Furthermore, as depicted in FIG. 1, on the voltage monitor chip, there may be a passive balance resistance and passive balance switch 150 connected with each battery cell 170. The BECM 130 is able to control the open and close of passive balance switch 150, and is also able to control current pass through DC/DC converter 160, 165.

In typical vehicle operation, the BECM controls operation of the power electronics module and the current flowing into the battery. However, during vehicle operation, the battery may be charged with current above the current limit at which lithium plating occurs because of a sensor function error, power electronics or control action delay, etc. For example, during a vehicle cold start, the power electronics module may lose capability of quickly isolating the battery from the electric machine in extreme low temperature (e.g., −40° C.). If the electric machine, acting as a generator, is rotated at high speed over a short time period (e.g., less than 10 seconds), the battery may be exposed to a higher voltage, and result in the charge current of battery exceeding the design limit.

The lithium plating on the anode of the battery, due to its exposure to current above the current limit for lithium plating for a short time during charging, can be removed by immediately discharging battery cell with a defined current in sufficient time after the battery has passed the higher charging current resulting in the lithium plating (i.e., a threshold current or voltage corresponding to lithium plating). The discharge current and length of discharging time are determined by the amount of lithium plated on anode (e.g., the difference between the threshold current or voltage and the actual current or voltage the battery was exposed to), and controlling the discharge current can remove undesired plated lithium by releasing lithium ions from the anode. The integral of the discharging current with respect to time can slightly exceed the amount it took to plate the lithium (e.g., equivalent to 105% of lithium amount plated). For example, if the amount of lithium plated is equivalent to about 300 coulombs, the discharge current and time range may be between about 10 A for about 32 seconds and about 100 mA for about 3,150 seconds. As such, a designed, predefined, or predetermined discharge current can be determined for removing the lithium plating. The discharge current may be a mild current, such that, in instances where there is no lithium plating or very little lithium plating, the discharge will not cause performance and cell issues. Furthermore, the designed current may be a pulsed current. For example, current amplitude may be about 2 C in pulses of about 10 to 30 seconds.

Figure 2:
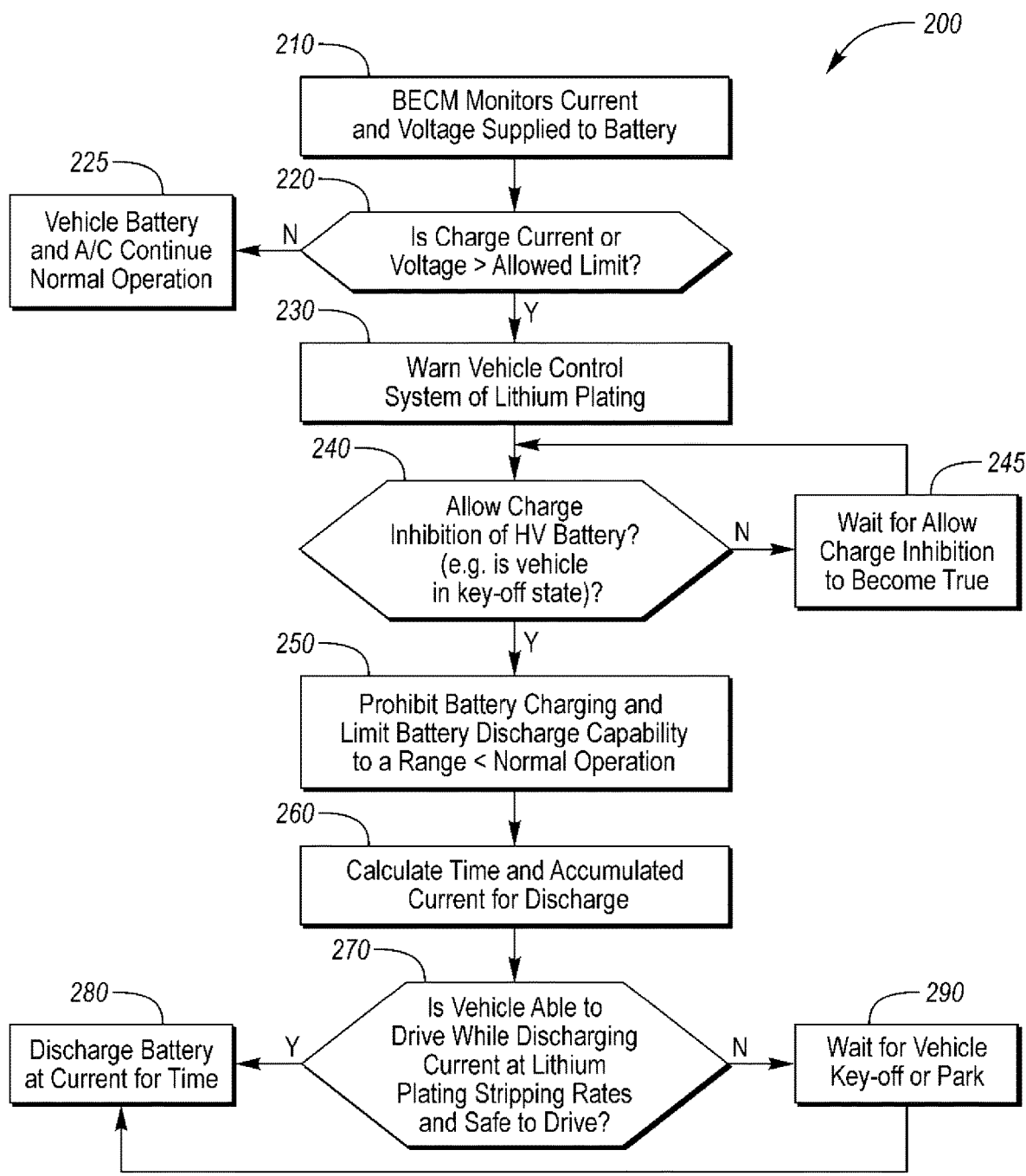
FIG. 2 shows a flow chart for the control logic for removing lithium plating, according to an embodiment.

Referring to FIG. 2, a flow chart showing the logic of the method 200 for remedying lithium plating in an HV battery is provided. At step 210, the BECM monitors the charging current and charging voltage supplied to the battery. At step 220, the BECM checks whether the charging current of the battery is out of the allowed range and/or a malfunction of the HV system power electronics has exposed the battery to a higher charge voltage and/or a higher charge current. If the battery has been exposed to a higher charge current or voltage than the allowed limit, at step 230, the BECM will issue a command to warn vehicle control system that the exposure may cause lithium plating. If the charging current and voltage are within the allowed range, at step 225, the vehicle, HV battery, and HVAC continue normal operation. At step 240, the vehicle control system receives the warning and checks whether the vehicle battery charging can be inhibited, such as, but not limited to, when the vehicle in a key-off state or can the vehicle be stopped without regenerative braking (i.e., in a predefined state). If the vehicle is not in a key-off state, or state where battery charging can be inhibited (e.g., the vehicle cannot be stopped without regenerative braking with normal mechanical brake operation), at step 245, the control system will wait for the charge inhibition to be allowed, and continue normal battery operation. If charge inhibition is allowed, at step 250, the BECM (or vehicle controller) will send a signal to the HV battery to prohibit battery charging, and battery discharge may be limited to a range less than normal operation. Specifically, the engine or generator is prohibited from further charging the HV battery. Further, at step 260, the BECM will, via a processor, calculate the time and/or accumulated current for battery discharge.

At step 270, the vehicle control system will determine if the vehicle is able and safe to drive (i.e., in a safe condition or predefined state, whether it is able to drive or able to get to a safe place) while discharging current to strip lithium plating. Whether the vehicle is able and safe to drive when the HV battery charge is inhibited and discharge is limited depends on the type of electrified vehicle. In hybrid and BEV, regenerative braking and engine charge would both be inhibited when the battery charge is inhibited and discharge is limited. Although vehicles may be designed to braked without regenerative braking, some vehicles cannot continue normal drive operation when charge is inhibited. In BEV, all power needed is provided by the HV battery. Drive power comes directly from the HV battery, and control system power depends on the 12V system as well. In BEV instances, the vehicle must be able and safe to drive when charge is inhibited, and the discharge capability may need to be limited to lower current than normal operation to allow the vehicle to get to a relatively safe place to stop. For BEV, the acceleration and speed may be affected if discharge capability is limited, and thus vehicle ability and safety to drive needs to be determined for discharge current design. For FHEV and PHEV, although drive power may be provided by the engine, the 12V system and climate control system need power from the HV battery. If the LV battery can meet the power need, the vehicle can be driven safely such that it can be turned, accelerated, decelerated, and stopped in response to driver input. When the designed current is a pulse current, the discharge current may be sent to the 12V system through the DC/DC controller, and is lower than the current required by the vehicle, and thus the control system is powered by the LV battery. When the LV battery is depleted, the vehicle will then have limited control ability and would not be safe to drive. Thus, when the HV battery is charge inhibited, the vehicle may be safe to drive to get to a relatively safe place to stop before the LV battery is depleted, since the vehicle control ability may be affected by the battery discharge.

Referring again to FIG. 2, if the vehicle driving condition is not safe for discharge, the BECM will wait for the vehicle to park or key-off at step 275. If the vehicle driving condition is safe per the above conditions (or the vehicle is parking), at step 280, the BECM will command the battery to discharge the current for the calculated time based on the predesigned function to remove lithium plating. During key-off or parking, the controller may command the battery to perform discharge, and the discharge current may charge the LV battery, heat the cabin, or dissipate through passive balance resisters instead of propelling the vehicle. The discharge current releases electrons from the anode of the battery. When discharge current flows from the battery, and the electrons are released from the anode, the battery may undergo internal reactions, such as, for example, dissolving plated lithium on the anode.

Referring again to FIG. 2, step 280 of discharging the battery in the predesigned function may occur in three ways. In an embodiment the HV battery may be discharged through a vehicle HVAC unit, such as a vehicle heater or A/C by the vehicle control system. For example, when the HV battery requires deplating, the vehicle will prohibit engine and generator charging of the HV battery, and calculate the time and current needed to discharge the battery. Step 280 includes commanding a vehicle heater or A/C compressor "ON" based on ambient temperature, if the voltage of all of the cells in the HV battery pack is higher than a critical value. During the discharging process, the BECM will monitor the cell voltage, calculate discharging time and accumulate discharge current, and issue the command of stop discharging if neither discharging time or accumulated discharge current reaches its stop limits, or one of cells voltage become below the critical value. The vehicle heater or A/C compressor may be controlled periodically (e.g., toggled ON and OFF) to form a pulse discharge current during the discharging of the battery.

In some embodiments, vehicle start may be prohibited when the battery may be charged or exposed to a high voltage even though no charge is permitted. For example, in the case of a vehicle cold start, the power electronics module may lose capability to isolate the battery from the generator, thus the voltage would exceed the allowed limit (at cold start), at step 220, resulting in lithium plating. The vehicle controller may, in the instance of a cold start, prohibit vehicle start and command the heater on to warm the vehicle by discharging the battery until the lithium plating is removed.

In another embodiment, the discharge of the battery may occur by controlling bypass current that flows from HV bus 110 to LV bus 120 through DC/DC converters 160, 165, as shown in FIG. 1. Although a bank of DC/DC converters are shown in FIG. 1, this is an example, and a single DC/DC converter may also be used. The bypass current flow through DC/DC converter 160, 165 may be controlled by a converter controller that controls the current draw from the HV battery cells to which each of the converters is connected. Upon the charge current or voltage exceeding the allowed limit at step 220, and the method reaches step 280 for discharging the battery, the BECM or vehicle controller will issue a command signal to the converter controller to direct the DC/DC converter to draw the calculated current from the cell of the HV battery that exceeded the limit. The current draw of each DC/DC converter may be controlled by the amplitude and/or shape (e.g., a pulse) that would be favorable for stripping plated lithium off the anode. Thus, the DC/DC converter will perform the HV cell discharge with the designed current to remove the lithium plating on the anode. When the designed current is discharged, the converter controller will resume normal operation to pass the desired current from the HV cell to the LV cell. Furthermore, the calculated discharge time may be used to signal to the converter controller to resume normal operation. The converter current draw for discharge may be a constant amount, or be a varied current.

Figure 3:
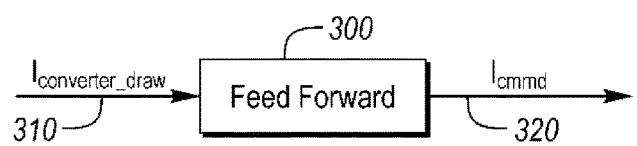
FIG. 3 shows a feed forward loop for a method of removing lithium plating, according to an embodiment.

In an embodiment, the converter controller may implement the discharge current and monitor the limit with a control loop such as, but not limited to, a feed forward loop 300, as shown in FIG. 3. The input command 310 of the converter controller is also the input of the feed forward loop, and can be determined with the equation:

$$I_{cmmd} = \frac{V_{des} I_{converter\_draw}}{V_{in} \eta}$$

where $I_{converter\_draw}$ is the converter output current on the LV side, $V_{des}$ is the voltage of vehicle LV bus, lemma is the target current 320 to be drawn by the DC/DC converters from HV cell; Vin is the voltage supplied for converting the input side; and $\eta$ is the conversion efficiency. In some embodiments, the controller may include both feed forward and feedback control loops. Thus, the feedback loop may be bypassed, and converter current draw may only be determined by the forward loop.

In yet another embodiment, the discharge of the battery may occur through bypass resistance. Upon the charge current or voltage exceeding the allowed limit at step 220, and the method reaches step 280 for discharging the battery, the BECM 130 or vehicle controller sends a signal to the DC/DC converter 160, 165 to open the passive balance resistance switch 150, as shown in FIG. 1. With the closing of the passive balance switch, a discharge current flows from the HV cell through passive balance resistance to ground. The discharge current may equal, for example, the cell voltage divided by the passive resistance. If a cell voltage is below a critical cell voltage, the passive balance switch is open such that the HV cell is not discharged. If the cell voltage is above the critical cell voltage, the passive balance switch remains closed and discharge current is flowed through the passive balance resistance. As previously discussed, the discharging of the cell may occur over a period of time (i.e., time needed for deplating), or may occur based on an accumulated discharging current. The passive balance switch may be controlled periodically to close and open to form a pulse discharge current.

In yet another embodiment, the passive balance resistance and bypass current embodiments may be combined together for use in vehicle applications. The bypass current method allows the energy draw from HV battery to be stored in a low voltage battery for later vehicle use, and controls the cell discharge current via the desired value based on the lithium plating. The desired value need not be constant, and the amplitude can be controlled by a favorable degree for stripping plated lithium from the anode, and, thus, the desired value could change over time. Furthermore, by combining the passive balance resistance and bypass current embodiments, the cells of the battery pack may be discharged separately via the converters that cells are connected to. In the bypass current method, if one cell's voltage is lower than the critical voltage, all of the cells connected to the same DC/DC converter cannot continue to be discharged. For example, for cells 1 to 3 of cells 170 connected with DC/DC converter 165, if among cells 1 to 3, one cell has a voltage below the critical value, the cells connected with DC/DC converter 165 cannot be discharged, however cells connected to other DC/DC converters 160 may be discharged. In the passive balance resistance method, a discharging cell is not affected by other cells. The combination of the method remedies the instance where individual cell voltage falls below the critical value. For example, if voltages of all the HV cells that are connected with a DC/DC converter are all above critical value, the HV cells will be discharged via the bypass current method. However, in case that at least one cell's voltage is below the critical value, the other cells may discharge using the passive balance resistance method.

In yet another embodiment, the HVAC discharge, the bypass current discharge, and the passive balance resistance discharge may also be combined together to remove lithium plating. When the HV battery is exposed to current or voltage above the limit in extreme cold conditions, the vehicle controller or BECM may use the HVAC system to discharge the battery to warm the cabin and remove the plated lithium that needs a discharge current, followed by the bypass current method to accurately control the condition of the discharge current, and finally using the passive balance resistance overnight in a parked vehicle to continue a small discharge current to help clean the lithium still depleted on the battery anode.

Thus, according to embodiments of the present disclosure, a method of removing lithium plating from a vehicle traction battery is disclosed. The method of the present disclosure removes plating in a cell using existing vehicle components. Further, the method can be performed to remove the lithium plating caused specifically by battery exposure to higher current, thus reducing battery aging and cell resistance. Upon detection of the battery being exposed to higher current, charging of the HV battery is stopped. Discharge of the battery is then limited (if the vehicle is in a safe condition), and the battery may be discharged using an HVAC system, bypass current via the DC/DC converter, or passive balance resistance by closing a passive balance switch. The discharging methods may be used separately or in combination, based on the designed current needed to be discharged over a predetermined time, as determined by the amount of lithium plating on the anode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for a vehicle, comprising:
by a controller,
responsive to charge current for a battery exceeding a threshold, inhibiting further charging of the battery,
responsive to the vehicle achieving a predefined state following the charge current exceeding the threshold, discharging the battery for a predetermined time at a predetermined current both defined by an amount and duration that the charge current exceeded the threshold to deplate lithium from an anode of the battery, and
preventing a vehicle cold start prior to discharging the battery.

2. The method of claim 1, wherein the predetermined current is a pulse current.

3. The method of claim 1, wherein the threshold is based on a limit related to when lithium plating occurs in the battery.

4. The method of claim 1, wherein discharging the battery includes operating a vehicle heater or AC connected to the battery.

5. The method of claim 1, wherein discharging the battery includes signaling, by the controller, a DC/DC converter to draw a bypass current flow from the battery defined by the predetermined current.

6. The method of claim 1, wherein discharging the battery includes closing, in response to a command from the controller, a passive balance switch to discharge the battery through passive balance resistance.

7. The method of claim 1, wherein the predefined state is an able to drive during discharge state, parked state, or key-off state.

8. A vehicle comprising:
a controller in communication with a battery and configured to,
responsive to charge current of a battery exceeding a threshold and the vehicle achieving a predefined state, inhibit battery charging and discharge the battery at a predetermined current for a predetermined time that are both defined by an amount and duration that the charge current exceeded the threshold to remove plated lithium from an anode of the battery; and responsive to the vehicle not achieving the predefined state, discharge the battery at a lower amount than the predetermined current until the vehicle achieves the predefined state.

9. The vehicle of claim 8, further comprising a DC/DC converter in communication with the controller and the battery, and configured to discharge the battery by drawing a bypass current flow from the battery defined by the predetermined current.

10. The vehicle of claim 8, further comprising a passive balance switch in communication with the controller, wherein the controller is configured to discharge the battery by closing the passive balance switch to discharge the battery through passive balance resistance.

11. The vehicle of claim 8, further comprising a vehicle heater or AC in communication with the battery and the controller, wherein the controller is configured to discharge the battery by operating the vehicle heater or AC.

12. A method for a vehicle comprising: by a controller, responsive to a charge voltage exceeding a threshold indicative of lithium plating on an anode, inhibiting battery charging responsive to the vehicle being in a predefined state, and discharging the battery for a predetermined time to release lithium ions at a predetermined current that is defined by an amount and duration the charge voltage exceeded the threshold to remove lithium plating on the anode, and, responsive to the charge voltage exceeding the threshold preventing a vehicle cold start prior to discharging the battery.

13. The method of claim 12, wherein the predetermined current is a pulse current.

14. The method of claim 12, wherein discharging the battery includes signaling, by the controller, a DC/DC converter to draw a bypass current flow from the battery defined by the predetermined current.

15. The method of claim 12, wherein discharging the battery includes closing, by the controller, a passive balance switch connected to the battery to discharge the battery through passive balance resistance.

16. The method of claim 12, wherein discharging the battery includes operating a vehicle heater or AC.

17. The method of claim 12, wherein the predefined state is an able to drive during discharge state, parked state, or key-off state.

* * * * *